Dec. 20, 1932.  G. O. C. PROBERT  1,891,395
GUN SIGHT
Filed Jan. 13, 1930   6 Sheets-Sheet 1

Inventor:
Geoffrey Oliver Carwardine Probert
By
Pennie Davis Marvin + Edmonds
attorneys

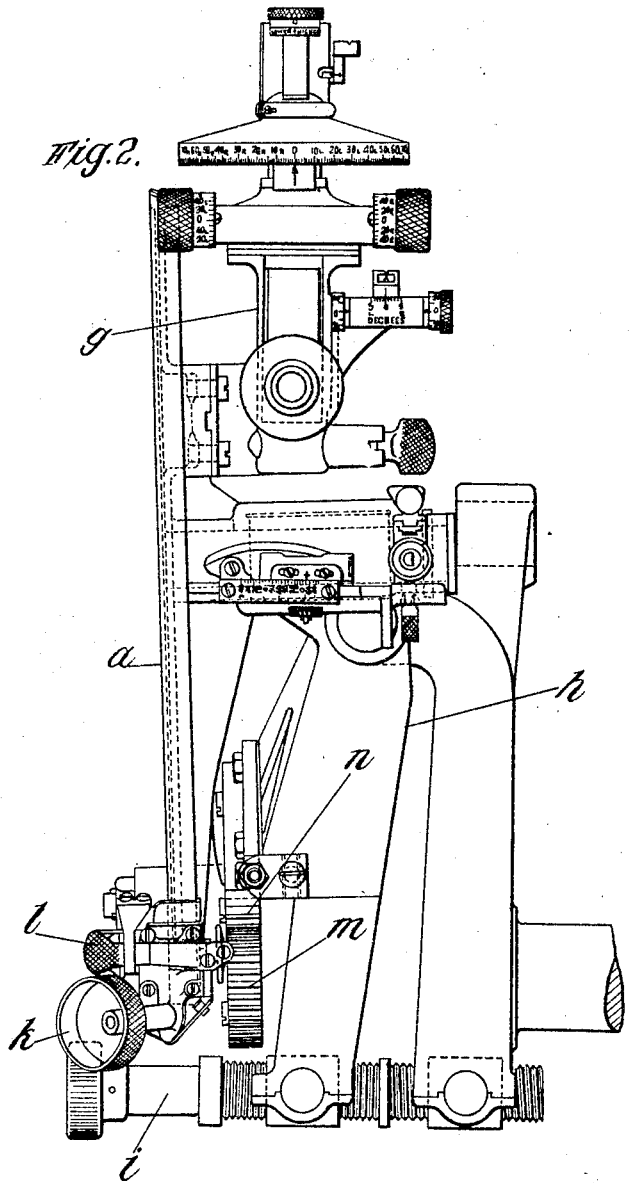

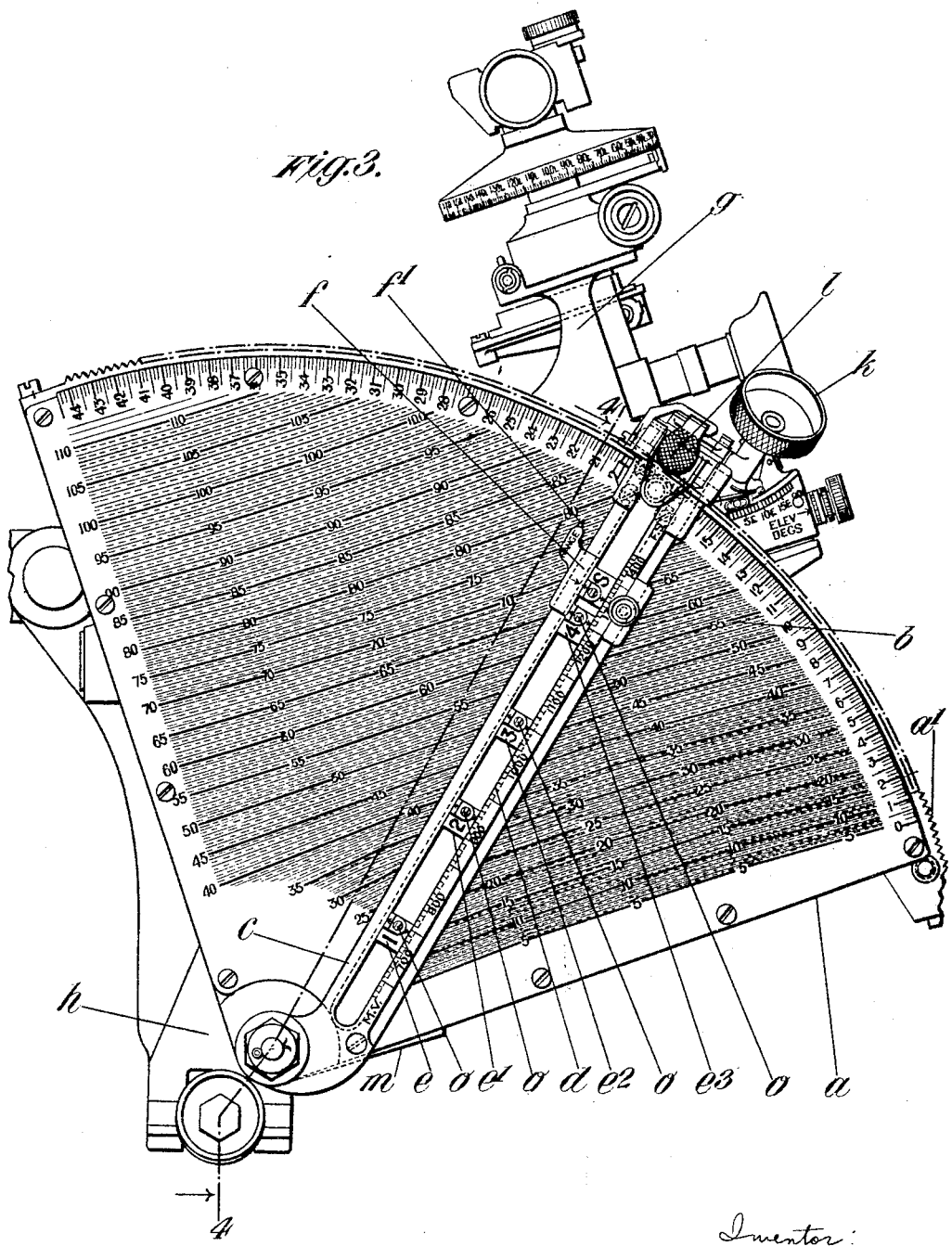

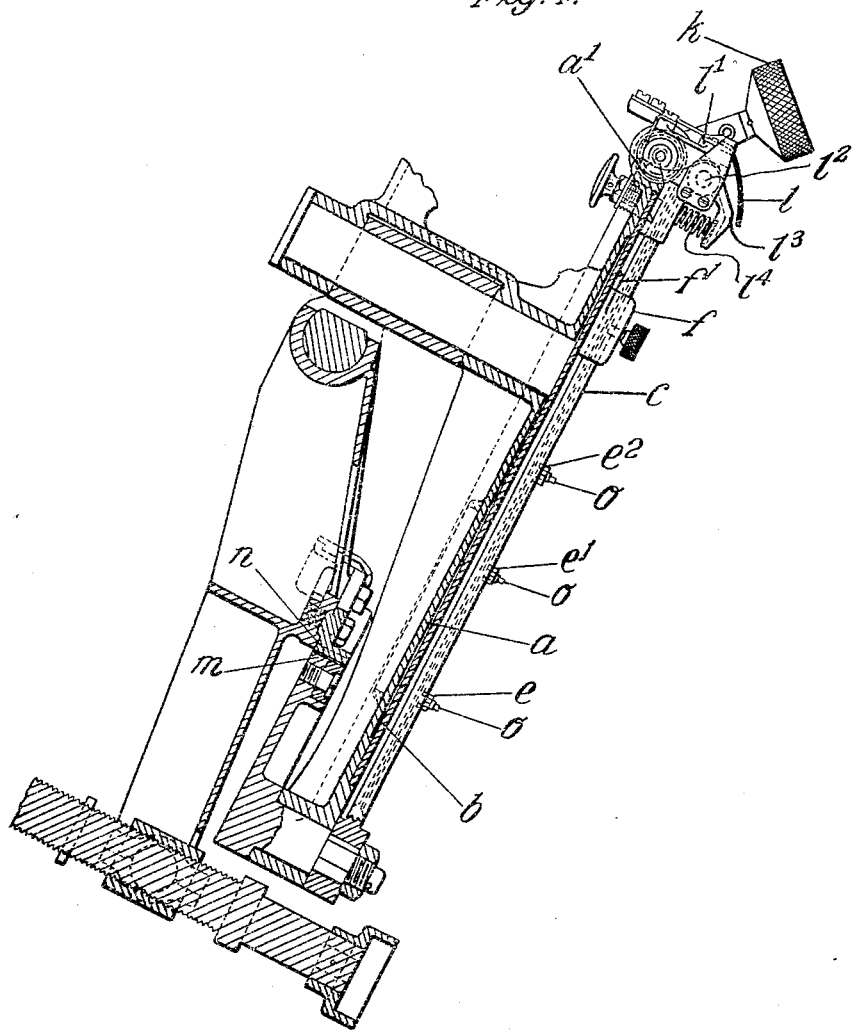

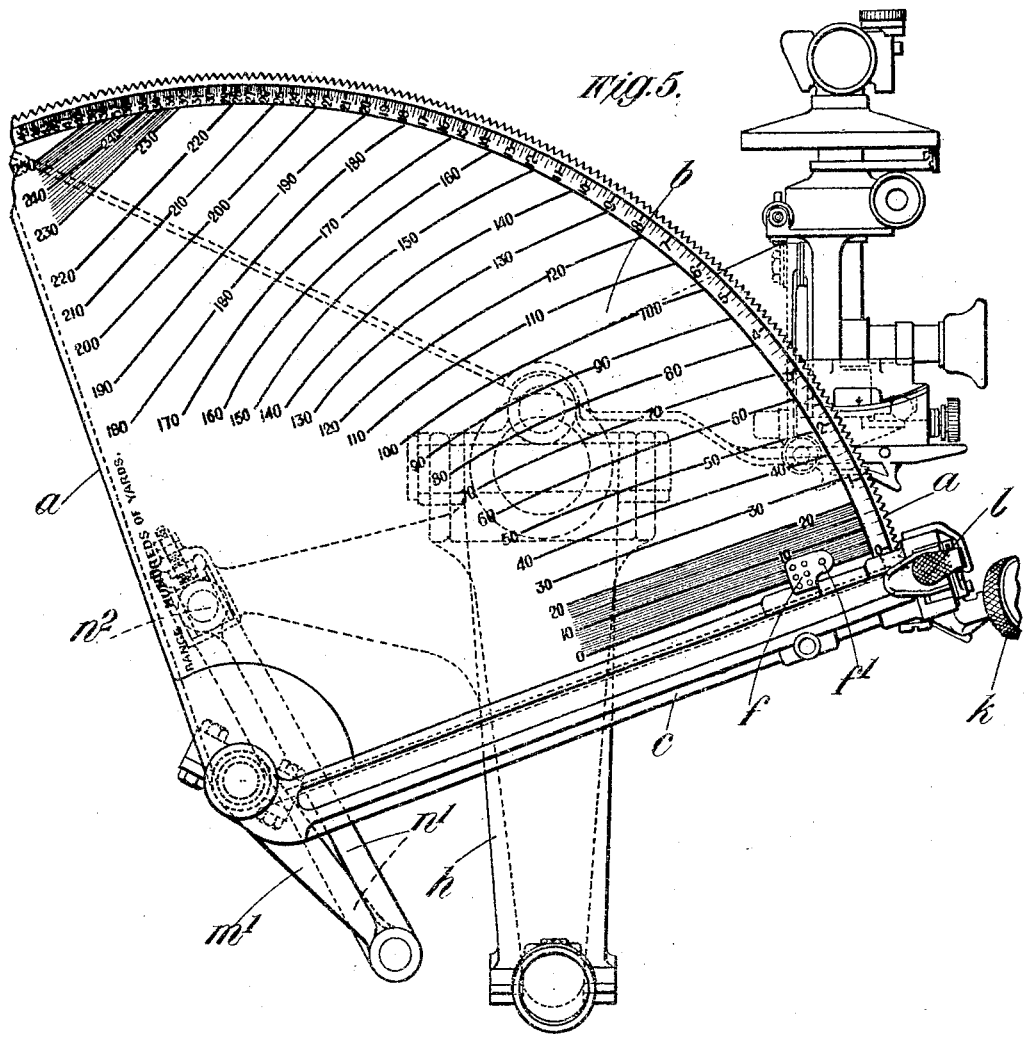

Dec. 20, 1932.  G. O. C. PROBERT  1,891,395
GUN SIGHT
Filed Jan. 13, 1930  6 Sheets-Sheet 6
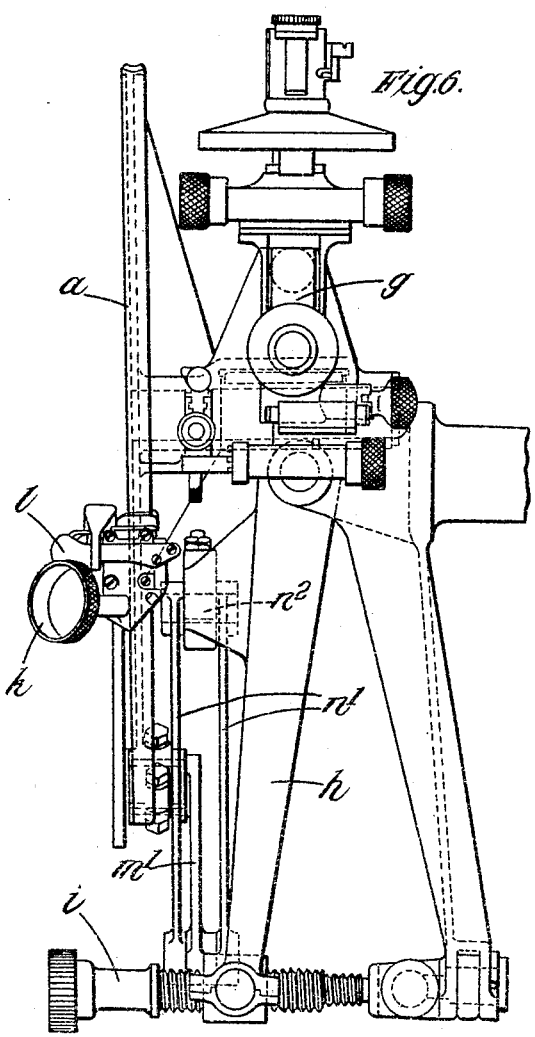

Patented Dec. 20, 1932

1,891,395

UNITED STATES PATENT OFFICE

GEOFFREY OLIVER CARWARDINE PROBERT, OF WOOLWICH, LONDON, ENGLAND

GUN SIGHT

Application filed January 13, 1930, Serial No. 420,547, and in Great Britain June 7, 1926.

This invention relates to gun sights for use with artillery in the field and has for its object to devise improvements in the construction and arrangement of sighting apparatus which will enable the correct tangent elevation for any permissible combination of range and muzzle velocity to be rapidly and readily ascertained and also to be applied to the gun in a very simple manner.

The invention consists in sighting apparatus for guns comprising an indicator on which ranges and muzzle velocities can be set in such a manner as simultaneously to yield and apply by simple mechanical means the exact range table value of the tangent elevation.

The invention also consists in sighting apparatus for guns comprising an indicator having range table data plotted thereon in suitable co-ordinates.

The invention also consists in sighting apparatus according to the preceding paragraph in which the indicator is associated with an arm bearing a muzzle velocity scale and the inclination of which indicates the elevation, the arm bearing a slider with a range pointer thereon.

The invention further consists in apparatus according to the preceding paragraph in which the muzzle velocity arm is also provided with movable markers adapted to varying charge weights, i. e. different weights or quantities of cordite used in the gun for propelling the projectile.

The invention still further comprises other details and arrangements hereinafter described or indicated.

In carrying my invention into effect in one convenient manner I take advantage of a property common to all artillery trajectories which may be stated approximately by the following equation:—$F(R) = f(v) \sin 2\phi$ which for parabolic flight is represented exactly by the equation:—

$$R = \frac{v^2}{g} \cdot \sin 2\phi$$

it being understood that in these equations R is the horizontal range, $v$ the muzzle velocity, $\phi$ the elevation, and $g$ the acceleration due to gravity.

An approximate relationship in the form of the first equation can be found to include all trajectories of any given projectile and if therefore (substituting $\theta$ for $2\phi$) the range table data appropriate to such a projectile are plotted in polar co-ordinates it is possible to choose a function $r = A f(v)$ in such a manner as to associate any given range $R_1$ with a straight line parallel to the line $\theta = 0$. Similarly any other range $R_2$ will be represented by another line which is nearly straight and nearly parallel to the line $\theta = 0$ so that in this way a diagram may be constructed with comprises a series of range lines, all of which are nearly straight and nearly parallel to the line $\theta = 0$, the distance from this line $\theta = 0$ increasing with the range and corresponding to A.F (R) where A is the scalar constant chosen.

The accompanying drawings illustrate two convenient forms of apparatus in accordance with the invention.

Figure 2 is an end elevation of Figure 1.

Figure 3 is a similar view to Figure 1, but showing the parts in a somewhat different position and with no parts broken away, Figure 4 is a section on the line 4—4 of Figure 3, Figure 5 is a front elevation showing another constructional form of the apparatus, and Figure 6 is an end elevation of Figure 5.

Figure 1:
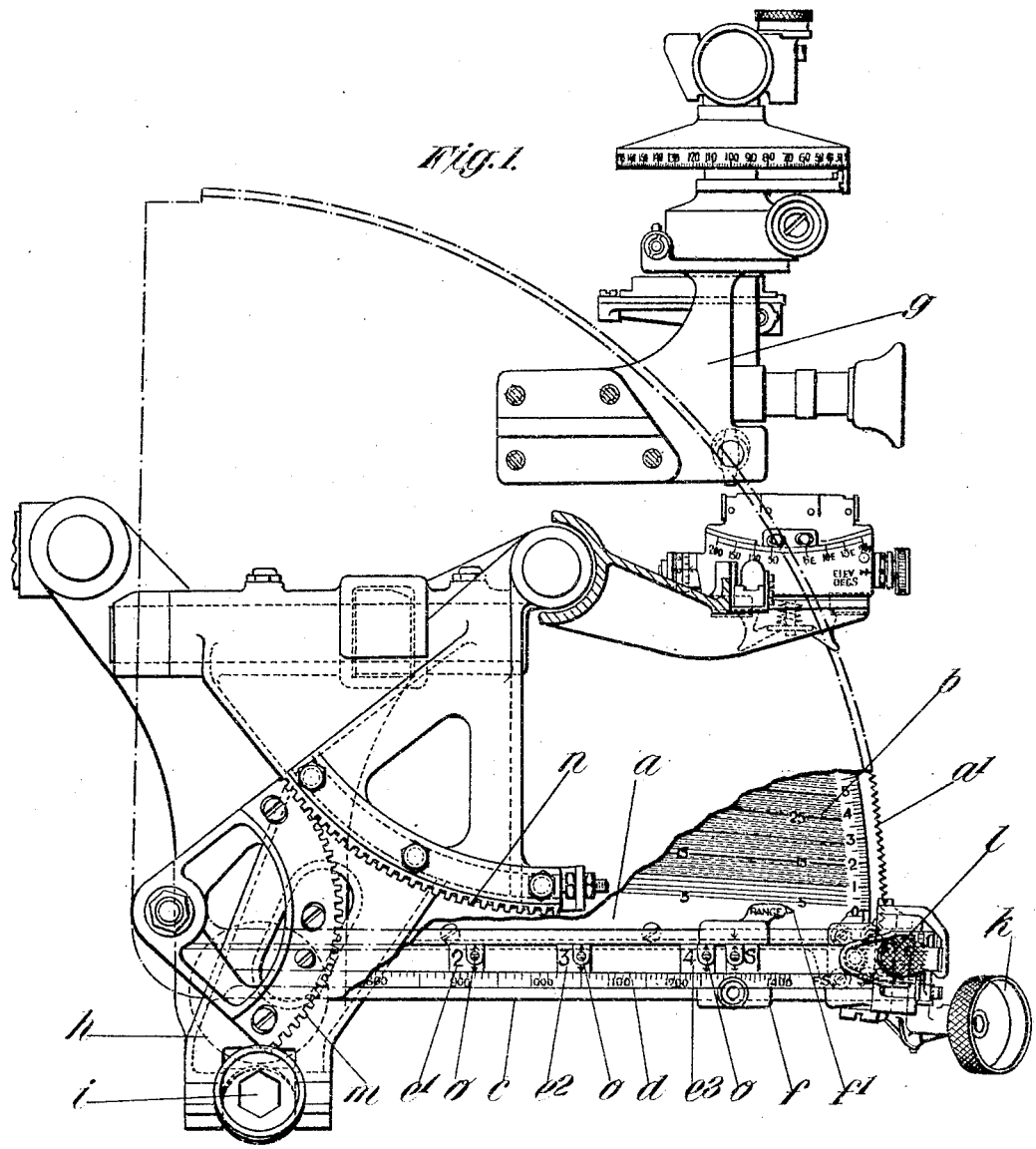
Figure 1 is a front elevation with parts broken away for clearness showing one constructional form of the apparatus.

Referring to Figures 1 to 4 a range indicator is provided in which the dial or plate $a$ bearing the range chart $b$ takes the form of a quadrant. A radial arm $c$ upon which is inscribed or marked a muzzle velocity scale $d$ and provided with movable markers $e$, $e^1$, $e^2$, $e^3$ termed "charge plates" (one for each charge weight) indicates the elevation ($\theta = 2\phi$). A slider $f$ with the range pointer $f^1$ is mounted upon the radial arm so that it may be set to the required muzzle velocity and the elevation is put on by rotating the arm until the pointer cuts the required range line on the dial.

Although the invention is not limited to reciprocating sights (i. e. those which are arranged to be moved about a pivot parallel to the axis of the gun to compensate for lack of level of the gun carriage wheels) it may very conveniently be applied thereto in which case the quadrant carrying the range chart may be made integral with or rigidly secured to a dial sight carrier $g$ and prepared to receive the usual angle of sight and cross level clinometers. The quadrant is arranged to pivot on an oscillating bracket $h$ which as is the case with other reciprocating sights is itself pivoted about an axis arranged so as always to be parallel to the axis of the gun and is also provided with a cross levelling screw $i$ to correct for difference in level of the gun carriage wheels.

The muzzle velocity arm $o$ which is furnished with a fine adjustment worm gear (operated from the milled head $k$) engaging worm teeth $a^1$ on the circumference of the quadrant and with a quick release device of suitable form so that it may be adjusted approximately to position directly by hand, is associated with a toothed arc $m$ (Figure 1) on the reverse side of the plate $a$. This quick release device comprises a knurled thumb plate $l$ connected to a bracket $l'$ (Figure 4) which carries the worm and the operating head $k$. This bracket $l'$ is pivoted at $l^2$ to part of the arm $c$ and has an extension $l^3$ between which and the said arm a compression spring $l^4$ is disposed. To release the worm from the teeth $a'$ the thumb plate $l$ is pressed inwardly thereby rocking the bracket $l'$ in a clockwise direction (Figure 4) in order to bring the worm out of engagement with the teeth $a'$. When the arm $c$ has been moved to its required position the thumb plate $l$ is released, whereupon the spring $l^4$ rocks the bracket $l^3$ in the reverse direction in order to bring the worm into engagement with the teeth $a'$. The arc $m$ is adapted to engage with a second arc $n$ of twice its radius rigidly attached to the oscillating bracket $h$ so that movement of the muzzle velocity arm $c$ will automatically cause the quadrant to move with respect to the bracket through one-half of the angle described by the muzzle velocity arm relative to the quadrant, the arrangement therefore being such that the angle described by the quadrant is $$\frac{\theta}{2}=\phi$$

which is the correct tangent elevation. By substituting bevel wheels for the arcs $m$ and $n$ the range indicator can be arranged to face the gun layer.

In order to calibrate a gun or howitzer for muzzle velocity by means of the sighting apparatus herein described the muzzle velocity arm is set to the elevation found in practice and the slider $f$ is then moved until the range pointer shows a range equal to the map range of the target corrected for atmospheric conditions and the charge plate corresponding to the charge in use is then set with an index mark coinciding with an index mark upon the slider whereupon a second index mark on the charge plate indicates upon the velocity scale the calibration muzzle velocity it being understood that the muzzle velocity arm will in general carry a number of charge plates. The calibration will be effected for the various charges represented by the charge plates and when the calibration has been completed for any particular gun or howitzer, such plates may be secured in position until the next calibration by means of a suitable fixing device as, for example, by the fixing screws $o$. When the charge plates are thus set, the slider $f$ is used in conjunction with any one of them (according to the charge weight in use) in order to determine the tangent elevation.

In operation the necessary adjustments are made that the required range and angle of sight are set upon the apparatus whereupon elevation is applied to the gun in the usual manner, that is, the gun and whole sighting system are rotated by the elevating gear until the angle of sight bubble reads level.

The utility of the indicator is not dependent upon the muzzle velocity arm being radial nor upon the correctness of the ratio $$\frac{\theta}{\phi}=2$$

as other ratios may be employed in which case the range lines will be convergent instead of parallel and the mechanism for correlating the movements of the quadrant and muzzle velocity arm may be modified to suit the particular ratio chosen.

The construction according to Figures 5 and 6 is based on an alternative equation $R=f(v) \sin \psi\phi$ and enables the relation $\theta=\psi\phi$ to be varied mechanically to suit any range table; it is also arranged that $\theta=90°$ when $\theta=45°$. In this construction the toothed arc $m$ on the spindle of the velocity arm $c$ in the construction according to Figures 1 to 4 is replaced by a crank $m^1$ which is connected by a link $n^1$ (replacing the toothed arc $n$) to a point $n^2$ on the oscillating bracket $h$. The relation between the angles described by the velocity arm $c$ on the quadrant or plate $a$ and by the latter with respect to the oscillating bracket $h$ ($\theta=\psi\phi$) depends on the lengths of the crank $m^1$ and link $n^1$ and on the point $n^2$ on the oscillating bracket at which link $n^1$ is connected. By altering these factors great accommodation is possible and the form of the relation $\theta=\psi\phi$ can be varied in accordance with the range table so that an approximately even range scale can be produced on the range chart $b$. It will be understood that apart from the replacement of the toothed arcs $m$ and $n$ by the crank $m^1$ and the link $n^1$ the construction according to Figures 5 and 6 is similar to the construction according to Figures 1 to 4 and the same reference letters are used for similar parts.

The indicator described may be employed as an indicator only and may thus be incorporated in sights on the independent line of sight system or may be employed with other apparatus for which its use may be indicated.

The invention is not to be limited to the foregoing details of construction which are given purely by way of illustration as I may modify the form of range chart and of muzzle velocity arm or indicator associated therewith as well as the means adopted for controlling the movement of the same depending upon any particular requirements that may have to be fulfilled, and, furthermore, with suitable modifications the apparatus may be designed to indicate fuze settings, etc., instead of or in addition to elevations.

What I claim and desire to secure by Letters Patent of the United States is:—

1. For use in connection with sighting apparatus for guns, in combination an indicator having range table data plotted thereon in suitable co-ordinates, an arm pivoted for movement over said data and bearing a muzzle velocity scale, means whereby the inclination of said arm indicates the elevation, a slider carried by said arm, a range pointer on said slider by which the arm is set to the required range line on the indicator and movable markers on said muzzle velocity arm for use with different charge weights.

2. For use in connection with sighting apparatus for guns, in combination an indicator having range table data plotted thereon in suitable co-ordinates, an arm pivoted for movement over said data and bearing a muzzle velocity scale, means whereby the inclination of said arm indicates the elevation, a slider carried by said arm, a range pointer on said slider by which the arm is set to the required range line on the indicator, a toothed arc carried by said muzzle velocity arm, and a second toothed arc gearing with the first mentioned toothed arc and connected to said indicator, the said toothed arcs having radii of definite ratio which will subsist between the angular movements of the arm and of the indicator.

3. Sighting apparatus for guns, comprising in combination an indicator having range table data plotted thereon in suitable co-ordinates, an arm pivoted for movement over said data and bearing a muzzle velocity scale, means whereby the inclination of said arm indicates the elevation, a slider carried by said arm, a range pointer on said slider by which the arm is set to the required range line on the indicator, a toothed arc carried by said muzzle velocity arm, a second toothed arc gearing with the first mentioned toothed arc and connected to said indicator, the said toothed arcs having radii of definite ratio which will subsist between the angular movements of the arm and of the indicator, and a sight carried by said indicator.

4. Sighting apparatus for guns, comprising in combination an indicator having range table data plotted thereon in suitable co-ordinates, an arm pivoted for movement over said data and bearing a muzzle velocity scale, means whereby the inclination of said arm indicates the elevation, a slider carried by said arm, a range pointer on said slider by which the arm is set to the required range line on the indicator, a toothed arc carried by said muzzle velocity arm, a second toothed arc gearing with the first mentioned toothed arc and connected to said indicator, the said toothed arcs having radii of definite ratio which will subsist between the angular movements of the arm and of the indicator, a sight carried by said indicator, means for mounting said indicator so that it can rock about an axis which is parallel to the axis of the gun and means for rocking said indicator about the first mentioned axis to compensate for lack of level of the gun carriage wheels.

5. In sighting apparatus for guns, in combination an indicator having range table data plotted thereon in suitable co-ordinates, an arm pivoted for movement over said data and bearing a scale of muzzle velocity, means whereby the inclination of said arm indicates the elevation, a slider carried by said arm, a range pointer on said arm by which the arm is set to the required range line on the indicator, a crank moving with said arm and a link for transmitting the motion of said crank to the indicator.

6. Sighting apparatus for guns, comprising in combination an indicator having range table data plotted thereon in suitable co-ordinates, an arm pivoted for movement over said data and bearing a scale of muzzle velocity, means whereby the inclination of said arm indicates the elevation, a slider carried by said arm, a range pointer on said arm by which the latter is set to the required range line on the indicator, a crank moving with said arm, a link for transmitting the motion of said crank to the indicator and a sight carried by said indicator.

7. Sighting apparatus for guns, comprising in combination an indicator having range table data plotted thereon in suitable co-ordinates, an arm pivoted for movement over said data and bearing a scale of muzzle velocity, means whereby the inclination of said arm indicates the elevation, a slider carried by said arm, a range pointer on said arm by which the latter is set to the required range line on the indicator, a crank moving with said arm, a link for transmitting the motion of said crank to the indicator, a sight carried by said indicator, means for mounting said indicator so that it can rock about an axis which is parallel to the axis of the gun and means for rocking said indicator about the first mentioned axis to compensate for lack of level of the gun carriage wheels.

8. For use in connection with sighting apparatus for guns, an indicator having range table data plotted thereon in suitable co-ordinates, a member which bears a muzzle velocity scale and is pivoted for movement over said indicator, a slider movable along said scale, a range pointer on said indicator and means whereby, when the slider is adjusted to the muzzle velocity and the movable member is adjusted to bring the range pointer on to the required range line on the indicator, the position of said member indicates the range table value of the tangent elevation.

9. For use in connection with sighting apparatus for guns, an indicator having range table data plotted thereon in suitable coordinates, a pivoted arm bearing a muzzle velocity scale and movable over said data, a slider carried by said arm, a range pointer on said slider by which said arm is set to the required range line on the indicator and means whereby the inclination of said arm indicates the elevation.

GEOFFREY OLIVER CARWARDINE PROBERT.